United States Patent
Flores-Ayala

(10) Patent No.: US 9,485,921 B1
(45) Date of Patent: Nov. 8, 2016

(54) BOX-LIKE ENCLOSURE FOR TRANSPORTATION OF CUT FLOWERS AND PLANTS IN CONTAINERS

(71) Applicant: Kendal Floral Supply, LLC, Carlsbad, CA (US)

(72) Inventor: Miguel A. Flores-Ayala, Molalla, OR (US)

(73) Assignee: KENDAL FLORAL SUPPLY, LLC, Carlsbad, CA (US)

( * ) Notice: Subject to any disclaimer, the term of this patent is extended or adjusted under 35 U.S.C. 154(b) by 0 days.

(21) Appl. No.: 14/701,807

(22) Filed: May 1, 2015

(51) Int. Cl.
```
B65D 25/54      (2006.01)
A01G 9/02       (2006.01)
A01G 13/00      (2006.01)
B65D 5/02       (2006.01)
B65D 5/468      (2006.01)
B65D 85/50      (2006.01)
```

(52) U.S. Cl.
CPC ............. *A01G 9/02* (2013.01); *A01G 13/0243* (2013.01); *B65D 5/0254* (2013.01); *B65D 5/4608* (2013.01); *B65D 85/505* (2013.01)

(58) Field of Classification Search
CPC ........ A01G 9/02; A01G 9/104; A01G 9/108; B65D 5/0254; B65D 5/4295; B65D 5/4608; B65D 5/6644; B65D 5/6652; B65D 85/50; B65D 85/505; B65D 85/52
USPC .................. 206/423; 229/148, 149; 47/84
See application file for complete search history.

(56) References Cited

U.S. PATENT DOCUMENTS

| | | | |
|---|---|---|---|
| 2,610,782 A * | 9/1952 | McReary | B65D 5/302 229/149 |
| 5,029,708 A | 7/1991 | Alonso et al. | |
| 5,325,602 A * | 7/1994 | Nainis | B65D 5/4295 229/120 |
| 6,419,087 B1 * | 7/2002 | Peters | B65D 5/4295 206/423 |
| 6,745,514 B1 * | 6/2004 | Myrland | A01G 9/026 47/84 |
| 7,007,426 B1 | 3/2006 | Ohlman, III et al. | |
| 9,096,366 B2 * | 8/2015 | Sabogal | B65D 85/505 |
| 2011/0174649 A1 * | 7/2011 | Garcia | B65D 85/52 206/423 |
| 2015/0089871 A1 | 4/2015 | Anderson | |

FOREIGN PATENT DOCUMENTS

| | | | | |
|---|---|---|---|---|
| EP | 0602744 A1 | 6/1994 | | |
| ES | EP 0319445 A2 * | 6/1989 | .......... | B65D 85/505 |
| GB | EP 1518799 A2 * | 3/2005 | .......... | B65D 85/505 |
| JP | 11198983 A * | 7/1999 | | |

OTHER PUBLICATIONS

International Search Report and Written Opinion for International Application No. PCT/US2016/030285, mailed on Jun. 27, 2016, in 13 pages.

* cited by examiner

*Primary Examiner* — Bryon Gehman
(74) *Attorney, Agent, or Firm* — Procopio, Cory, Hargreaves & Savitch LLP; Lisel M. Ferguson

(57) ABSTRACT

A box-like enclosure for transporting cut flowers and plants is provided. The box has an upper wall, four side walls, and an open lower end. The box can be of predetermined cross-sectional dimensions sized to receive a container for holding cut flowers with a clearance fit. The box can a plurality of openings for increased air flow within the box and for a user to engage with their hands when moving the box alone or the box and enclosed container. An air gap is provided above the top of the flowers. The enclosure can be made as a flat blank of suitable water-resistant material which can easily be assembled when needed.

20 Claims, 8 Drawing Sheets

BOX-LIKE ENCLOSURE FOR TRANSPORTATION OF CUT FLOWERS AND PLANTS IN CONTAINERS

BACKGROUND

Technological Field

This invention relates generally to a box or enclosure and system for protective transportation of cut flowers, plants and the like from a supplier to a wholesaler or retailer.

Related Art

Cut flowers and bunches of flowers can be placed in bucket-type containers which contain water or foam soaked with water. In some cases, the containers are simply placed in a vehicle for delivery, but this significantly limits the amount of containers which can be delivered since no stacking is possible. In other known systems such as the Procona® packing system, a pre-bent cardboard strip is wrapped around the flowers and placed into the edge of the container to form a collar which extends above the upper ends of the flowers. A special machine may be used to place the collar. In the next step, a lid is placed on top of the collar. Finally, the package is closed with a strapping band. On arrival at the store or point of sale, the process is reversed to remove the strap, lid, and collar, which are then discarded. This is a multi-step, time consuming process and results in significant waste of materials.

SUMMARY

In one aspect, a box-like enclosure used for transport of cut flowers and other plants has an upper wall, side walls, and an open lower end, and is of predetermined cross-sectional shape and cross-sectional dimensions matching but slightly larger than the shape and dimensions of a container for holding plants, cut flowers, or bunches of flowers in water or a watering medium such as water-soaked foam, soil, or similar materials. The enclosure or box may be of rectangular cross-section or circular cross-section. The box or enclosure has a plurality of openings at predetermined locations including slots for a user to engage with their hands when moving the box alone or the box and enclosed container, and air flow holes. The height of the box is greater than the height of the container and plants or flowers, so that there is an air gap above the top of the flowers or plants for air circulation to keep the flowers fresh. The box like enclosure is provided in a plurality of different sizes to match different cut flower or plant container sizes.

In one aspect, the enclosure is made as a flat blank of a suitable lightweight and water resistant material such as wax-coated cardboard, with score lines defining side walls, front and rear walls, and flaps designed for interengagement to form the upper wall. In some embodiments, the wax coating may be a food-grade wax coating. The supplier can easily fold the blank to form the container, engaging the upper wall flaps to secure the box in the assembled condition ready for use. A flap along the edge of the part of the blank forming the front, rear, and side walls can be adhered over an adjacent wall portion to further secure the box in the assembled condition.

In another aspect, a method of transporting a container of cut flowers, plants or the like comprises positioning a box of predetermined cross-sectional shape and cross-sectional dimensions matching but larger than the container shape and cross-sectional dimensions above the container and aligned with the container Other features and advantages of the present invention will become more readily apparent to those of ordinary skill in the art after reviewing the following detailed description and accompanying drawings.

DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a box or an enclosure with an open lower end and dimensions sufficient for positioning the box over a container or bucket containing a watering medium and cut flowers, plants, or the like, during transportation. The box has provisions for a user to engage the container through appropriately positioned slots in the box for carrying purposes, and for air flow during transportation even when boxed containers are stacked.

After reading this description it will become apparent to one skilled in the art how to implement the disclosed embodiments. However, although various embodiments of the present invention will be described herein, it is understood that these embodiments are presented by way of example only, and not limitation.

Figure 1:
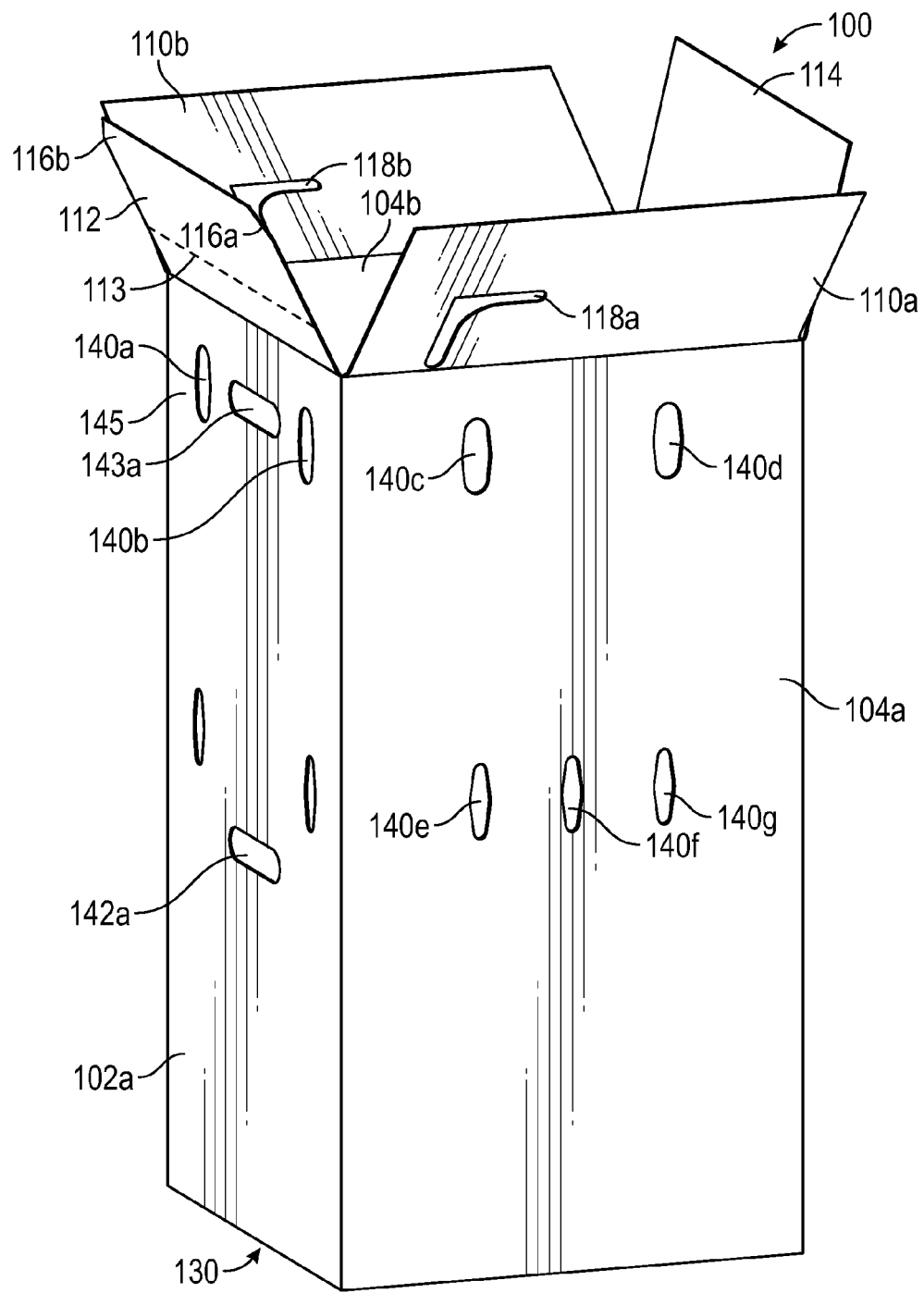
FIG. 1 is a side perspective view of a box for transporting cut flowers or plants.
Figure 3:
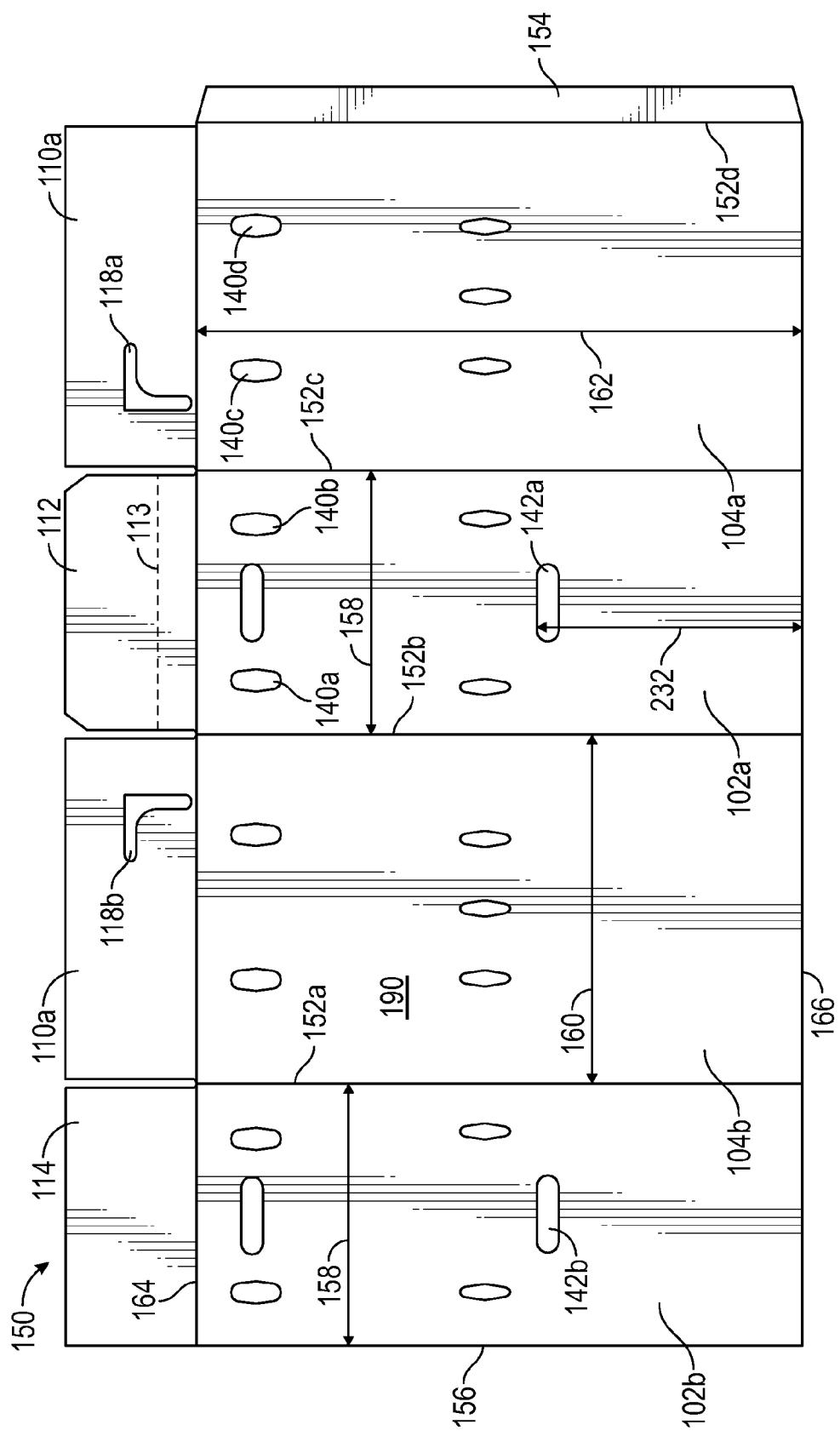
FIG. 3 is a top plan view of a flat blank that can be assembled to produce the box of FIGS. 1 and 2.

FIG. 1 is a side perspective view of a box transporting cut flowers or plants. A box-like enclosure (hereinafter "box") 100 can have four panels, or side walls, shown as a pair of side walls 102a, 102b (collectively side walls 102) and a pair of side walls 104a, 104b (FIG. 3). The side walls 104a, 104b may collectively be referred to herein as side walls 104. The side wall 104b is not shown in this figure due to the perspective. The side wall 102b is not shown in this view of the box 100. Each pair of the side walls 102 and the side walls 104 are disposed opposite each other, such that side walls 102 and the side walls 104 alternate. In some embodiments, the side walls 102 can have different lateral dimensions than the side walls 104. In some other embodiments, the side walls 102 can be similar to the side walls 104, for example having the same dimensions. Accordingly, the box 100 can have a square or rectangular lateral cross section. The box 100 can be formed of a suitable lightweight and water-resistant material such as for example, a wax-coated cardboard. In some embodiments the wax coating may be a food-grade wax coating. The wax coating can extend the life of the box 100 through multiple reuses, as described herein.

As used herein, the term "cardboard" may also be synonymous fiberboard, or corrugated fiberboard, commonly having two outer layers of fiber and a plurality of flutes therebetween to provide structural support.

Figure 6:
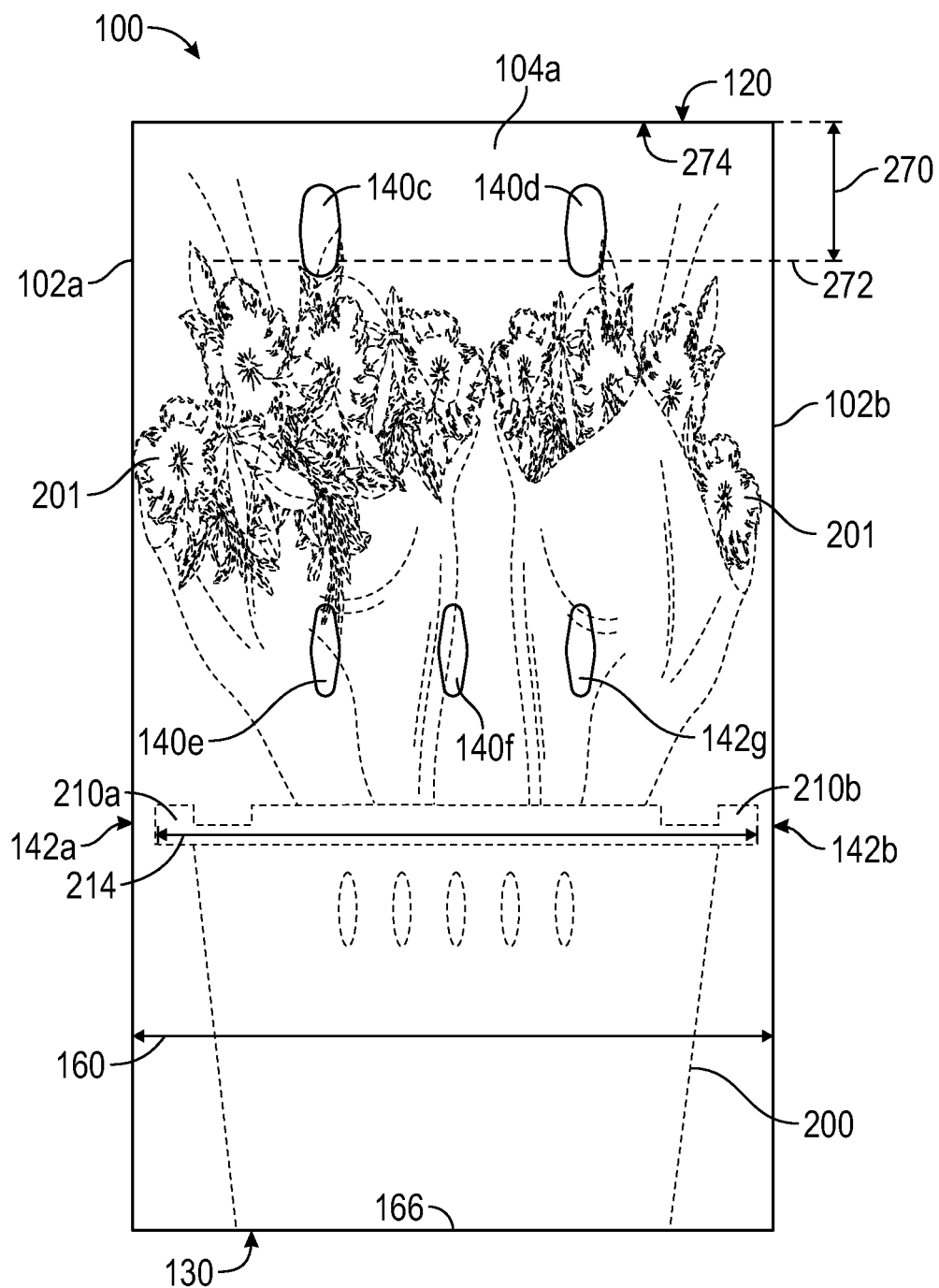
FIG. 6 is a side elevation view of the container of FIG. 4 positioned within the box of FIG. 1 and FIG. 2.

The box 100 can also have an upper wall 120, shown in FIG. 6. The upper wall 120 can have a pair of side flaps 110a, 110b (collectively side flaps 110), a front flap 112, and back flap 114. In some embodiments the box 100 can be open at a lower end 130. In use, the box 100 can be positioned over a container of flowers (described below) and then closed to secure the box 100. The box 100 can have a height greater than the height of the container of flowers.

In some embodiments, the side flaps 110, the front flap 112, and the back flap 114 can be designed for interengagement to form the upper wall 120. When closing the box 100, the back flap 114 can be closed first with the side flaps 110 folded over the back flap 114 to partially enclose the contents of the box 100. The front flap 112 can have corners 116a, 116b (collectively corners 116) that can be inserted into a corresponding pair of slots 118a, 118b (collectively slots 118) formed in the side flaps 110 and sized to receive the corners 116. In some embodiments, the slots 118 can have an "L" shape as shown. In some other embodiments, the slots 118 can be a single straight cut or aperture formed in the side flaps 110, as required. Inserting the corners 116 of the front flap 112 can secure the upper wall 120 of the box 100 without the use of adhesives, tape, or other mechanical securing methods. Such a closure can also allow the box 100 to be repeatedly reused. In some embodiments, the wax coating can also aid in extending the life of the box 100, and more particularly the portions of the box 100 that are repeatedly folded and unfolded, such as, for example, the side flaps 110, the front flap 112, the back flap 114, and the corners 116, among the other folds disclosed herein.

Figure 2:
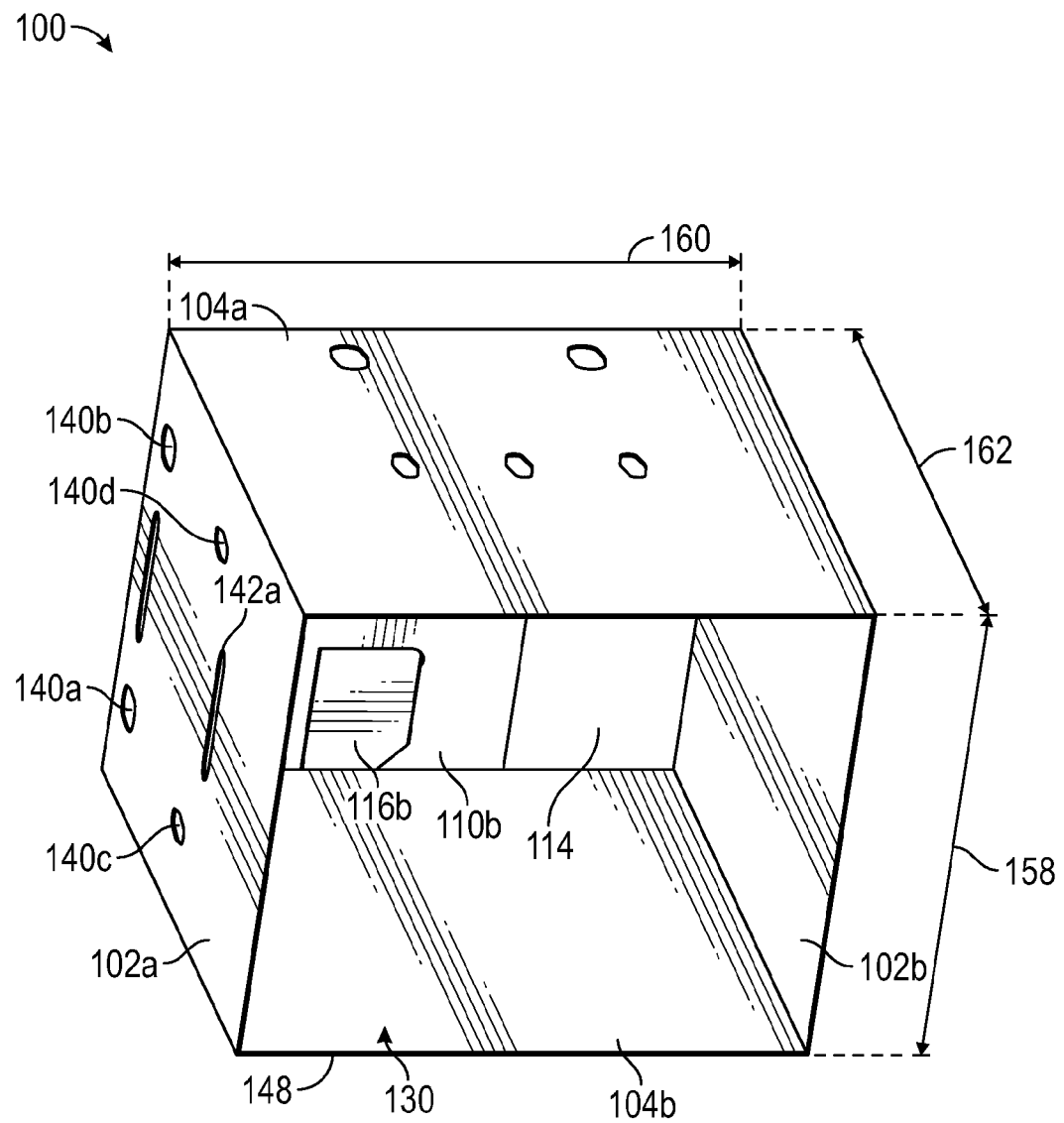
FIG. 2 is a bottom perspective view of the box of FIG. 1.

In some embodiments, the corners 116 can have round or flat corners that can help to preserve the life of the box 100 following multiple reuses. The front flap 112 can also have a fold 113 (shown as a dashed line) allowing the front flap 112 to bend providing sufficient clearance allowing the corners 116 to be inserted within the slots 118. The fold 113 can further extend the life of the box 100 by providing a fold position for the front flap 112. In some embodiments, the front flap 112 can measure 10 to 14 inches wide and four to 10 inches deep. In some other embodiments, the front flap 112 can be six inches deep by 11.75 inches wide. While there is flexibility in the measurements and overall size of the front flap 112, the width of the front flap can largely be defined or at least limited by the width of the side walls 102 (described in FIG. 2). The back flap 114 can also measure 10 to 14 inches wide and four to 10 inches deep. In some embodiments, the back flap 114 can measure 11.75 inches wide and six inches deep. In a similar manner to the front flap 112, the dimensions of the back flap 114, especially the width, can be limited by the width of the side walls 102 (FIG. 2).

In some embodiments, the side flaps 110 can measure from 10 to 18 inches wide and four to 10 inches deep. In some other embodiments, the side flaps can be six inches by 15.5 inches. While there is flexibility in the measurements and overall size of the side flaps 110, the width of the side flaps 110 can largely be defined or at least limited by the depth of the side walls 102 (described in FIG. 2).

The box 100 can also have a plurality of openings 140. Individual openings 140 are labeled with a lowercase letter (e.g., 140a, 140b, 140c, etc.) however they may be collectively referred to herein as openings 140. The openings 140 can be formed in the box 100 in specific or predetermined locations on the side walls 102 and the side walls 104 to allow airflow within the interior of the box 100. In an embodiment there are at least four openings 140 per side wall 102 and per side wall 104. In an embodiment, the side walls 104 can have five or more openings. In another embodiment, the side walls 102 can have fewer openings (e.g., four). This can be due to the presence of other holes in the side walls 102 (e.g., the handle holes, see below) that can also allow air to flow to the interior of the box 100. In some embodiments, there can be fewer or more openings 140 according to the overall size of the box 100. Accordingly, in some other embodiments, the box 100 can have as many openings 140 as necessary so long as the structural integrity of the box 100 is not compromised by a plurality of openings 140.

The openings 140 can have various shapes. In some embodiments, the openings 140 can be round or rectangular. The openings 140 can further have a diamond shape or a diamond shape with round corners as depicted in the figures. In some embodiments, the openings 140 can be one to three inches wide and one to four inches high. If the openings 140 are round, the openings 140 can have a diameter of one to three inches. In some other embodiments, the openings 140 can have a perimeter measuring approximately seven to eight inches. In embodiments such as those shown, the openings 140 can be 2.25 inches high by one inch wide, oriented vertically.

The airflow throughout the box can aid in preserving and maintaining the freshness of the flowers or other plants protected by the box 100. In some embodiments, when multiple boxes 100 are stacked atop one another, the openings 140 are not obstructed allowing air the flow to the flowers within the box (see, for example, FIG. 8). In some other embodiments, when transporting multiple boxes 100 together, the openings of adjacent boxes 100 may coincide with each other further allowing airflow from one box 100 to another. This can be advantageous as airflow is increased even when multiple boxes 100 are stacked on top of one another.

The box 100 can also have a pair of handle holes 142a, 142b (collectively handle holes 142). The handle hole 142b is not shown in this view. The handle holes 142 can be apertures formed in the side walls 102 of the box 100. The handle holes 142 can further be disposed on the side walls 102 to correspond with handles 210 of the container 200 (FIG. 4), in use. The handle holes 142 can be formed as slots through which an intended user can engage his or her hands to move the container of flowers and the box 100 together, or to move the box alone. A second pair of handle holes 143a, 143b (collectively handle holes 143) can also be formed in the side walls 102. The handle hole 143b is not shown in this view. The handle holes 143 can be disposed on an upper end 145 of the box 100. The handle holes 143 can be positioned to provide the intended user a convenient location to grip the box 100 when lowering the box 100 over the container of flowers (FIG. 5) or removing the box 100 when a delivery is complete.

The size of the handle holes 142 can vary. In some embodiments, the handle holes 142 can measure from three to six inches wide and one to two inches tall so as to accommodate a hand, or at least fingers reaching through to grasp the box 100 and the container (FIG. 4) together. In some other embodiments, the handle holes 142 can measure 1.125 inches tall and 3.5 inches wide. In some embodiments, the handle holes 142 can have a rectangular shape. In some other embodiments, the handle holes 142 can have a round or oblong shape as shown in the figures. The oblong shape of the handle holes 142 can avoid sharp corners (as in, e.g., a rectangular hole) in the cardboard (or fiberboard), preserving the life of the box 100 over multiple reuses. The handle holes 143 can have a same or similar size as the handle holes 142.

In some embodiments, when the delivery is complete, the intended user can use the handle holes 143 to lift the box 100 off the container 200 and the flowers 201. The corners 116 of the front flap 112 can be removed from the slots 118. The side flaps 110 and the back flap 114 can then also be unfolded. The entire box 100 can then be folded flat for transport back to the supplier. In addition, the box 100 can also be recycled when no longer needed.

FIG. 2 is a bottom perspective view of the box of FIG. 1. As noted above, the box 100 may have an open lower end 130. As shown, a bottom side (FIG. 7) of the upper wall 120 is visible through the open lower end 130. In some embodiments, the side walls 102 can have a width 158. Similarly, the side walls 104 can have a depth 160. The width 158 and the depth 160 may be generally referred to herein as lateral dimensions. As noted above, the depth 160 can be larger than the width 158, defining a rectangular cross section 148. In some other embodiments, the width 158 can be equal or substantially equal to the depth 160 forming the box 100 with a square cross section 148. The lateral dimensions (e.g., the width 158 and the depth 160) can be adjusted to fit around or accommodate a specific container, described below.

In some embodiments, the width 158 can measure eight to 14 inches, the depth 160 can measure 12 to 20 inches, and the height 162 can measure 20 to 40 inches. In some other embodiments, the width 158 can measure 12 inches, the depth 160 can measure 16 inches, and the height 162 can measure 27.5 inches. As noted above, for example, the side flaps 110 can measure 15.5 inches providing sufficient clearance from the adjacent front flap 112 and back flap 114 for the closure of the side flaps 110. In a similar manner, the front flap 112 and the black flap 114 can measure 12.75 inches, providing clearance from the side flaps 110 when opened and closed.

Figure 7:
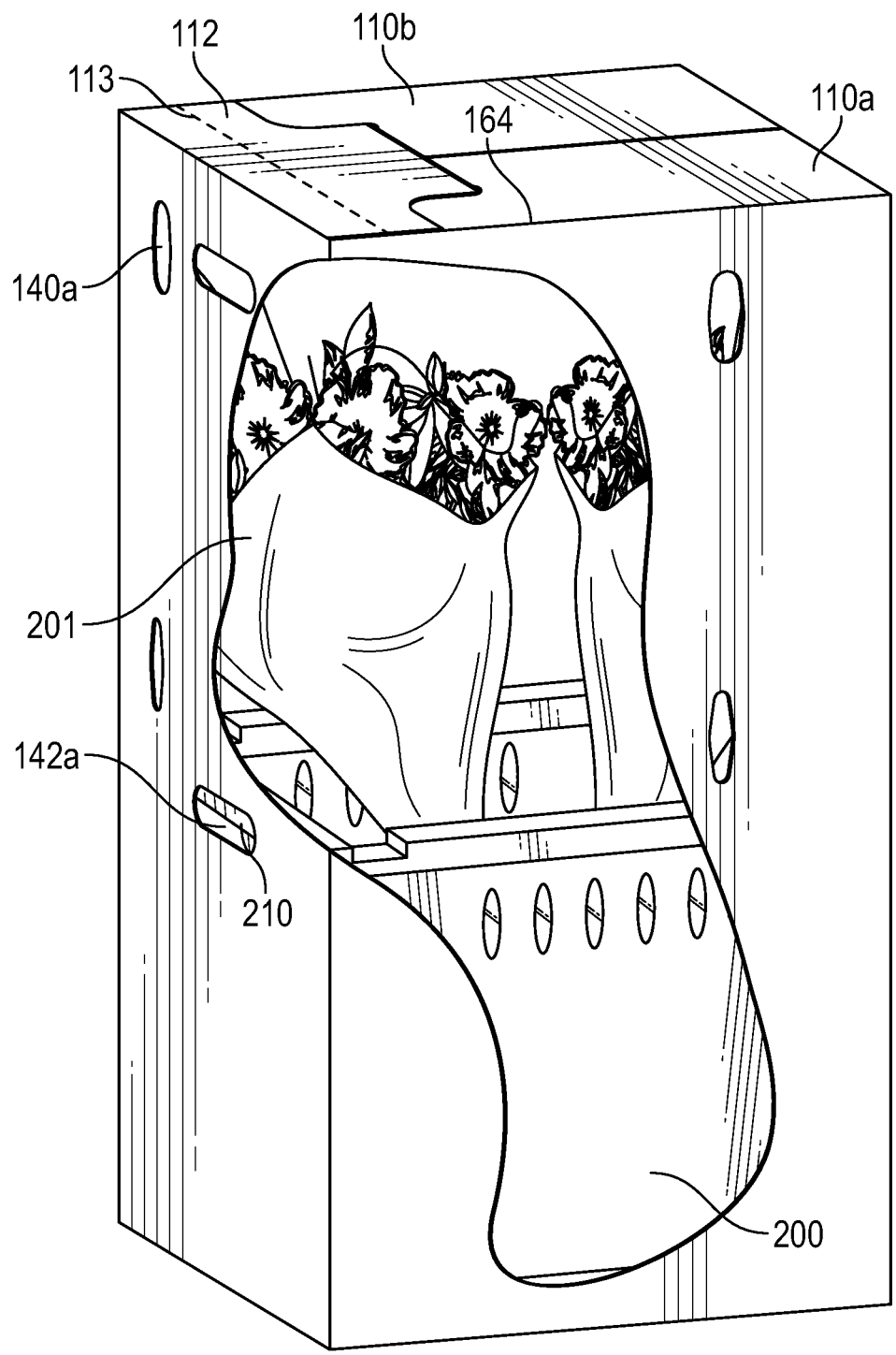
FIG. 7 is a cutaway view of the box of FIG. 6 showing the positioning of the container of flowers inside.

In some embodiments, foregoing dimensions can be predicated on size of the container (FIG. 4), a height of the flowers (FIG. 4) carried within the box 100, and an amount of space desired between the flowers and the upper wall 120 of the box 100 (see, for example, FIG. 6, FIG. 7). Accordingly, the measurements (e.g., the width 158, the depth 160, and the height 162) can vary as needed.

FIG. 3 is a top plan view of a flat blank that can be assembled to produce the box of FIG. 1 and FIG. 2. A blank 150 can be formed of panels corresponding to the side walls 102 and the side walls 104 of the box 100. Each of the panels of the blank 150 is labeled by the corresponding to the particular side wall (e.g. the side walls 102, 104) it will become when the box 100 is assembled. The blank 150 can also have a plurality of fold lines, 152a, 152b, 152c, 152d (collectively fold lines 152). The fold lines 152 can represent the location at which the blank 150 can be folded to form the box 100. It should be appreciated that the orientation and arrangement of the panels (e.g., the side walls 102 and the side walls 104 is exemplary. Other arrangements are possible without departing from the scope or spirit of the disclosure.

In some embodiments, the blank 150 can be die-cut from cardboard and folded to create the box 100. In some embodiments, the blank 150 can be die-cut or otherwise formed from corrugated cardboard. In some other embodiments, the cardboard can have a thickness of 32 edge crush test (ECT).

The thickness of the blank 150 can then measure from approximately one eighth of an inch to over one quarter of an inch. The actual thickness of the blank 150 can be dependent on the ECT rating of the cardboard (or fiberboard), for example (e.g., 32 ECT).

The blank 150 can also have a tab 154 that is formed to mate with an outer edge 156 of the side 102b and be secured in place with an adhesive, such as glue, for example. In some examples, a user, such as a supplier, can fold the blank 150 at the fold lines 152 to form the box 100. The tab 154 can then be adhered to the outer edge 156. The upper wall 120 can then be formed by engaging the side flaps 110, the front flap 112, and the back flap 114 to secure the box 100 in an assembled condition, ready for use. The tab 154 can be adhered over or under a portion the adjacent side wall 102b at the outer edge 156 to further secure the box 100 in the assembled condition.

In addition to the width 158 and the depth 160, the box 100 can also have a height 162. The height 162 can generally describe the height of the completed box 100, once the flaps (e.g., the side flaps 110, the front flap 112, and back flap 114) have been folded over the contents of the box 100 and secured in place using the corners 116 and the slots 118. The height 162 can also be defined as the distance from a box top 164 of the box 100 to a bottom edge 166 of the box 100. The bottom edge 166 can be adjacent to the floor when the completed box 100 is in use.

In some embodiments, the blank 150 can be coated in a protective coating 190. The protective coating 190 can aid in the preservation of the blank 150 through transport and multiple reuses (as the completed box 100 for example). The protective coating 190 can also aid in the preservation of the box 100 once the blank 150 has been folded and secured with the tab 154. As described herein, the box 100 can be folded used and then collapsed for multiple reuses. The protective coating 190 can provide increased resiliency to the box 100 as the fold lines 152 and the fold 113 are exercised. In some embodiments, the protective coating 190 can also provide protection from water and certain levels of impact during transport or storage. Accordingly, the protective coating 190 can be a wax coating or similar coating to increase water resistance and resilience. In some other embodiments, the protective coating 190 can be a food grade wax coating. It should be noted that the reference numeral for the protective coating 190 appears on the panel 104a; however, the protective coating can extend over both sides of the entire blank 150. In some other embodiments, the protective coating 190 is recyclable, allowing the entire blank 150 or the completed box 100 to be recycled when no longer needed.

Figure 4:
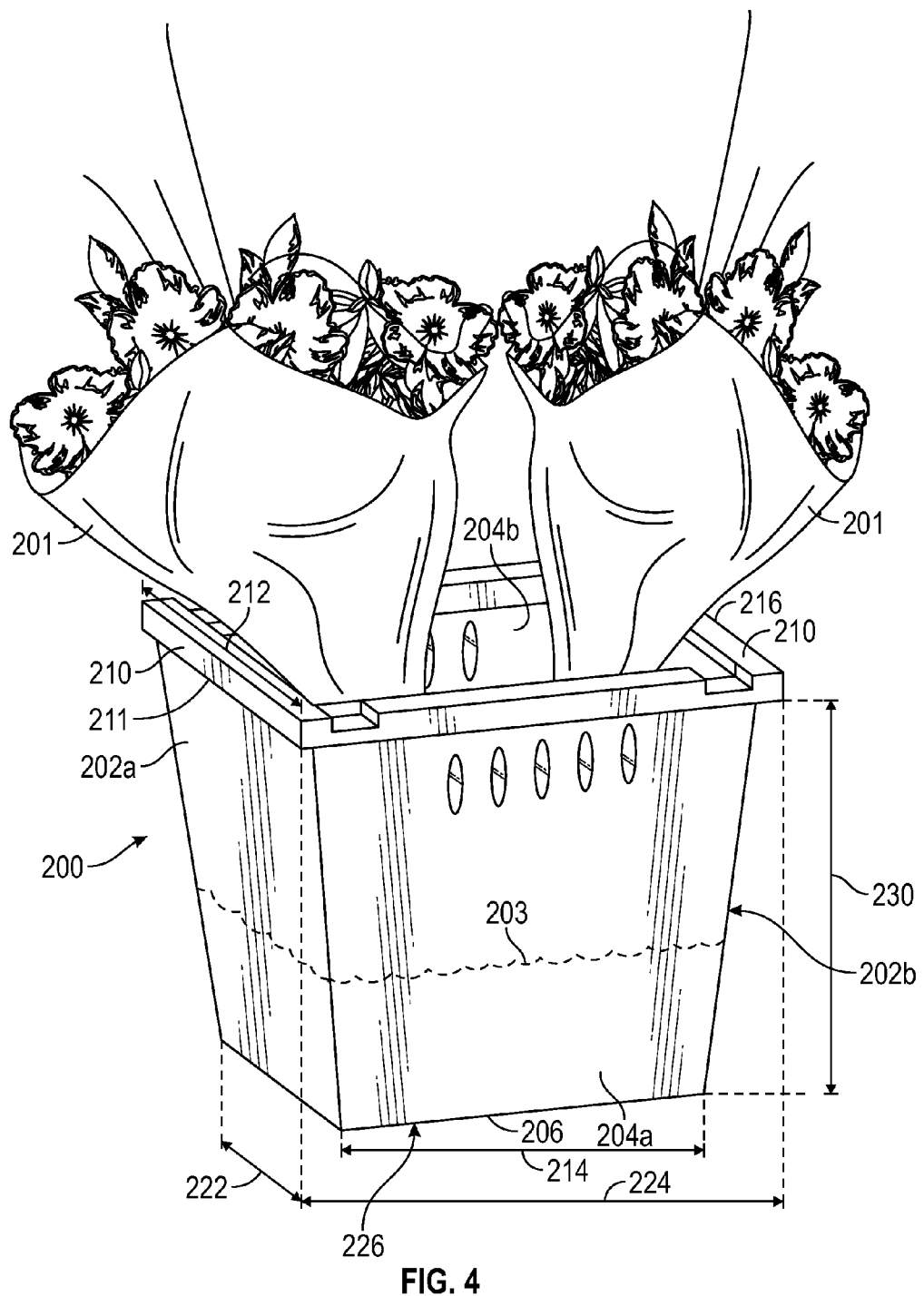
FIG. 4 is a perspective view of a container of flowers prior to placement of the box of FIG. 1 and FIG. 2 over the container.

FIG. 4 is a perspective view of a container of flowers prior to placement of the box of FIG. 1 and FIG. 2 over the container. A container 200 can have a first pair of sides 202a, 202b (collectively sides 202) and a second pair of sides 204a, 204b (collectively sides 204). The container 200 can also have a bottom 206 coupled to the sides 202 and the sides 204 to form a watertight vessel or container. The container 200 can be arranged to hold a quantity of flowers 201 or plants, in addition to a quantity of watering medium 203 to preserve the freshness of the flowers or plants. The watering medium 203 is indicated by a dotted line to show its position within the container 200. In some embodiments, the watering medium can be water-soaked foam or similar materials. In some other embodiments, the watering material 203 can be a quantity of water alone.

The container 200 can have a pair of handles 210a, 210b (collectively handles 210) disposed on opposite sides of the container 200 and corresponding to the sides 202. The handles 210 can also have a bottom edge 211 that can be gripped by the intended user for moving the container 200. The bottom edge 211 of the handles 210 can be set a height 230 from the bottom 206. The sides 202 can have a width 212. In a similar manner, the sides 204 can have a depth 214. The width 212 and the depth 214 can describe a surface area 216 that defines a top opening of the container 200. In some embodiments, the width 212 can be similar to or slightly smaller than the width 158 of the box 100. In some embodiments, the width 212 of the container 200 can be approximately 20 to 30 centimeters (cm). In some embodiments, the depth 214 can be approximately 30 cm to 40 cm. The width 214 can also be similar to or slightly smaller than the depth 160 of the box 100. Accordingly, the cross section 148 of the completed box 100 can be slightly larger than the surface area 216 of the container 200. Therefore the box 100 can be formed to surround the container 200 with a clearance fit. As noted above, in some embodiments, the box 100 can have a cross section 148 with dimensions 12 inches by 16 inches. The container 200, therefore, can have dimensions slightly smaller than the open bottom 130 of the box 100.

The bottom 206 of the container 200 can have dimensions that are smaller than the width 212 and the width 214. The sides 202 can have a bottom width 222. The sides 204 can have a bottom depth 224. The bottom width 222 and the bottom depth 224 can define a surface area 226 that can be smaller than the surface area 216. Accordingly, each of the sides 202 and each of the sides 204 can have a generally trapezoidal shape. In some embodiments, the container 200 can have an inverted square pyramidal frustum shape. Such an arrangement can provide an opening at the top of the container 200 (and surface area 216) that is larger than the surface area 226 of the bottom 206.

Figure 5:
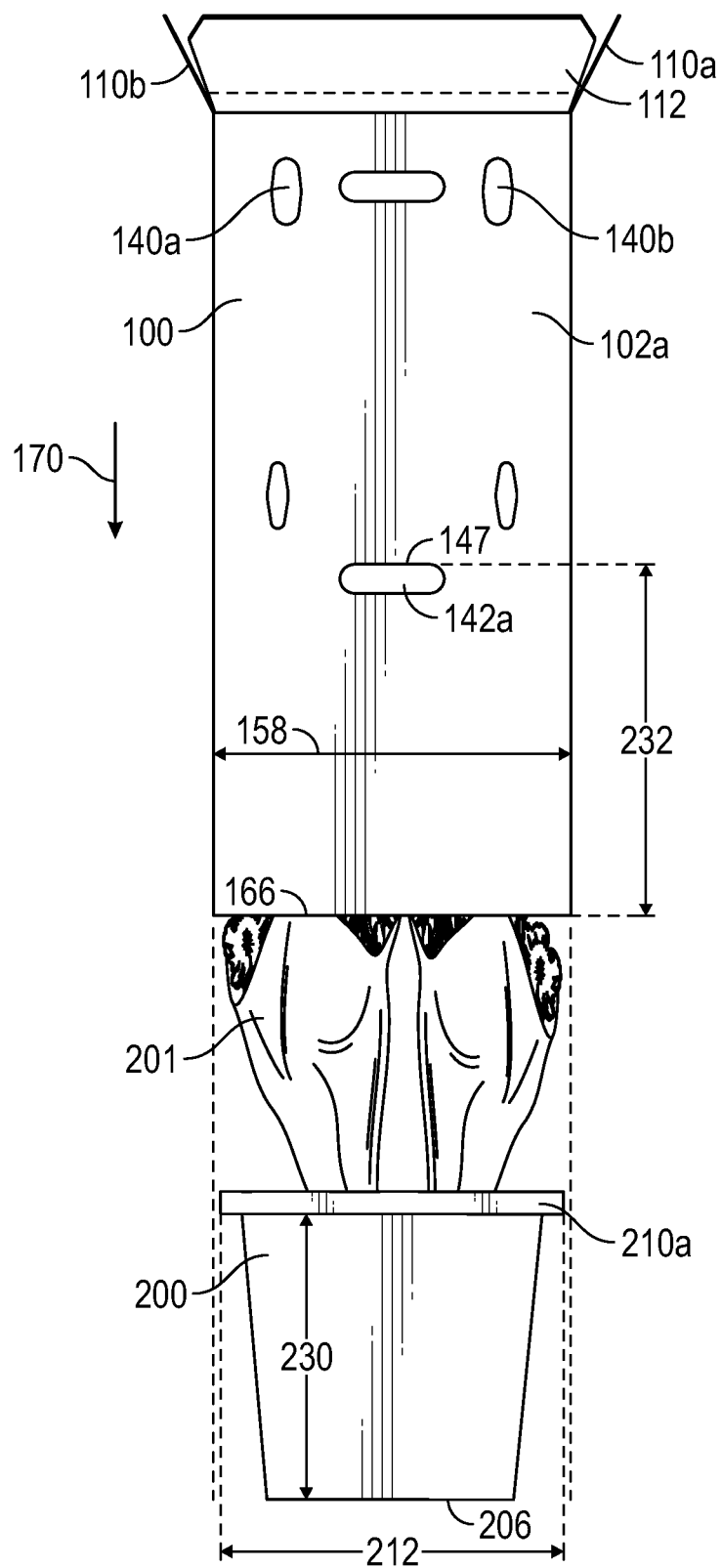
FIG. 5 is a front elevation view of the box of FIG. 1 and FIG. 2 being lowered over and covering the container of FIG. 4.

FIG. 5 is a front elevation view of the box of FIG. 1 and FIG. 2 being lowered over and covering the container of FIG. 4. In use, the box 100 can be lowered in a direction 170 over the container 200 with a clearance fit around the container 200. As previously noted, the container 200 can be used to transport a quantity of watering medium 203 (FIG. 4) and a quantity of flowers 201 or other plants. Thus, the box 100 can protect the flowers 201 during transport.

Once the box 100 is positioned over the container 200, the flaps 110, 112, 114 can be closed. The corners 116 can be tucked into the slots 118 to secure the upper wall 120 of the box 100. As noted above, the handles 210 can be positioned a height 230 from the bottom 206 of the container 200. The handle holes 142 can also be disposed a similar distance 232 from a bottom edge 166. In some embodiments, the bottom 206 of the container 200 can be positioned on the ground or other surface, thus the handles 210 and the handle holes 142 can be aligned when the box 100 is positioned over the container 200 (shown below). In some embodiments, a top edge 147 of the handle holes 142 can be aligned with the bottom edge 211 of the handles 210. Accordingly, the handles 210 are accessible via the handle holes 142 when the box 100 is situated over and surrounding the container 200. The container 200 and the box 100 can then be carried by gripping the handles 210 through the handle holes 142.

FIG. 6 is a side elevation view of the container of FIG. 4 positioned within the box of FIG. 1 and FIG. 2. The container 200 and the flowers 201 are depicted in dotted lines indicating their presence and position within the box 100. As noted above, the box can have the depth 160 slightly larger than the depth 214 and a cross section 148 (FIG. 2) slightly larger than the surface area 216 (FIG. 4) of the container 200. This can allow the box 100 to be positioned over and contain the container 200 with a clearance fit.

In some embodiments, the height 162 (FIG. 3) of the box 100 can provide an air gap 270 over the flowers 201. The air gap 270 can provide an area into which air can flow from the openings 140 (FIG. 1) to preserve the flowers 201. The air gap 270 also provides space so that the flowers 201 are not crushed or damaged during transport. In some embodiments, the air gap 270 can provide from four (4) to six (6) inches of space between the top 272 of the flowers 201 and the inside 274 of the upper wall 120 or from the top of the flowers to the box top 164.

FIG. 7 is a cutaway view of the box of FIG. 6 showing the positioning of the container of flowers inside. When the box 100 is positioned over the container 200 and the flowers 201, the height 162 can accommodate the air gap 270 between a top 272 of the flowers 201 and an inside 274 of the upper wall 120. The air gap 270 can provide a space to protect the flowers 201 during transport.

As shown, the handles 210 of the container 200 are accessible via the handle holes 142 as shown. In some embodiments, as noted above, the bottom edge 211 of the handles 210 may be at approximately the same height as the top edge 147 (FIG. 5) of the handle holes 142.

Figure 8:
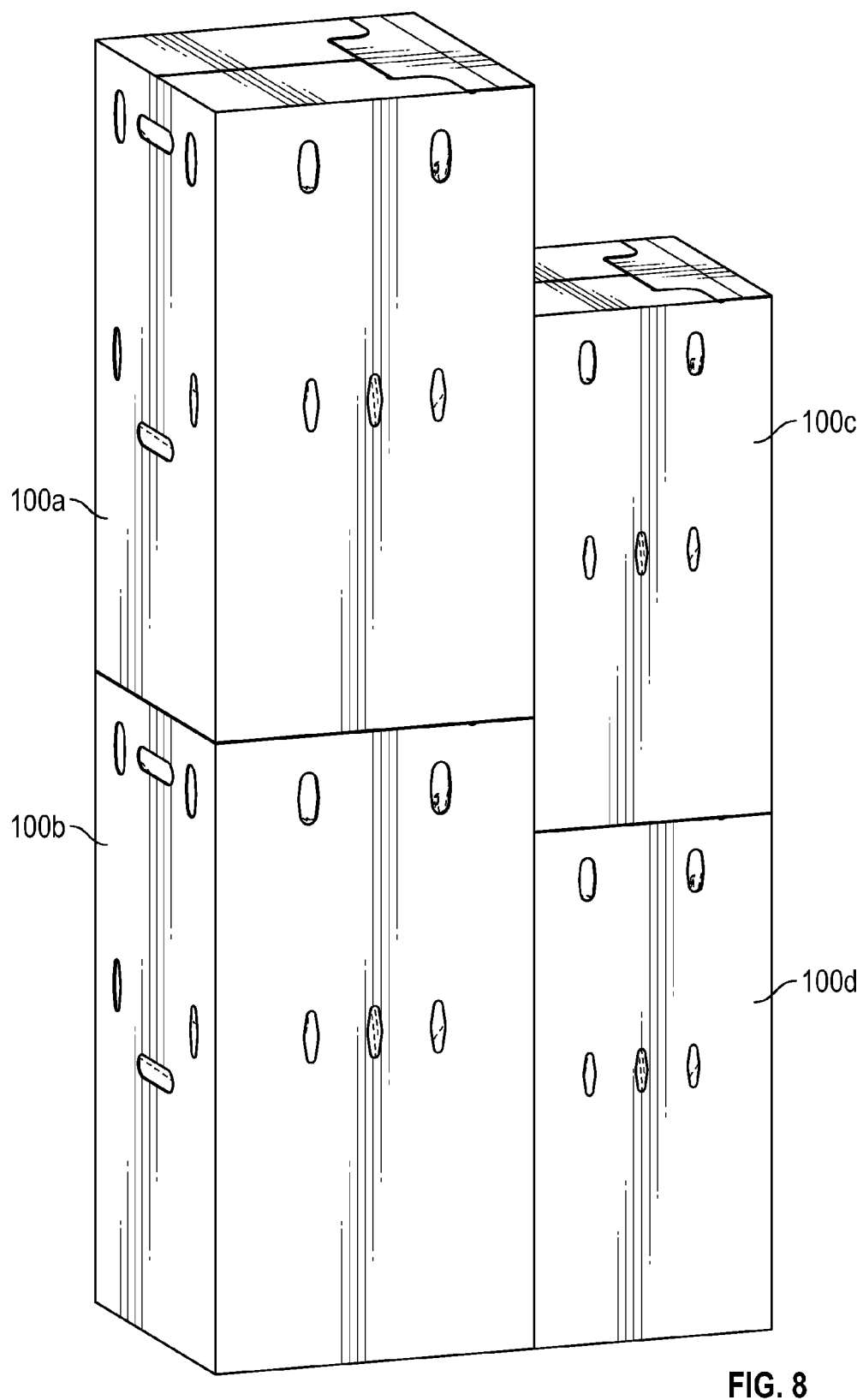
FIG. 8 is a perspective view of multiple boxes of FIG. 1 and FIG. 2 stacked for transportation.

FIG. 8 is a perspective view of multiple boxes of FIG. 1 and FIG. 2 stacked for transportation. As noted above, multiple boxes 100 can be stacked atop one another for transport. In some embodiments, multiple sizes of the boxes 100 can be used. As shown a box 100a and a box 100b can be a larger size than a box 100c and a box 100d. In some embodiments, various sizes of the boxes 100 can also accommodate multiple or various sizes of the container 200.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

I claim:

1. A device for lifting protecting and preserving plants and cut flowers contained therein comprising:
   a container having four sides, a bottom, an open top, and a pair of handles disposed on opposite sides of the container at a first height; and
   a protective box, having
      a first pair of side walls defining a width of the protective box, the first pair of side walls being disposed on opposite sides of the protective box;
      a second pair of side walls defining a depth of the protective box, the second pair of side walls connected to the first pair of side walls and disposed on opposite sides of the protective box and alternating with the first pair of side walls;
      an upper wall connected to each of the first pair of side walls and the second pair of side walls;
      a plurality of openings formed at predetermined locations in the first pair of side walls and the second pair of side walls, the plurality of openings configured to allow air to flow into and out of the protective box;

an open lower end that does not enclose the bottom of the container, the open lower end defined by a bottom edge of each of the first pair of side walls and the second pair of side walls, the open lower end having a cross section defined by the width and the depth of the protective box and sized to receive the container in a clearance fit;

a respective handle hole formed in each of the first pair of side walls, each handle hole being disposed a second height from the open bottom, the second height being similar to the first height of the pair of handles, such that each handle of the pair of handles is accessible through the first pair of side walls via the respective handle hole, wherein the protective box is free of any attachment to the container.

2. The device of claim 1 wherein the first height and the second height align a top of the handle hole adjacent to a bottom of a handle of the pair of handles of the container.

3. The device of claim 1 further comprising a plurality of flowers within the container, wherein the protective box provides four inches or more space between a top of the flowers and an inside of the upper wall when the protective box surrounds the container.

4. The device of claim 1 further comprising at least a second handle hole formed in each of the first pair of side walls, the at least a second handle hole being located at an upper end of the box between the at least one handle hole and the upper wall.

5. The device of claim 1 further comprising a pair of side flaps, a back flap, and a front flap, the pair of side flaps, the back flap, and the front flap being configured to interengage to form the upper wall.

6. The device of claim 5 wherein each side flap of the pair of side flaps comprises a slot, each slot being sized to receive a corresponding corner of the front flap.

7. The device of claim 1, wherein the protective box is formed from a single cardboard blank, the single cardboard blank having a water resistant coating.

8. The device of claim 7, wherein the cardboard blank has a thickness of 32 edge crush test (ECT).

9. The device of claim 1, wherein the width is 8 to 14 inches and the depth is 12 to 20 inches, and wherein each of the first pair of side walls and the second pair of side walls have a height of 20 to 40 inches.

10. A device for lifting and protecting cut flowers and plants during transport, the device comprising:
a container having four sides, a bottom, an open top, and a pair of handles disposed on opposite sides of the container at a first height; and
a blank for making the protective box having,
a pair of first panels having a first width and a box height;
a pair of second panels having a second width and the box height, each second panel of the pair of second panels being disposed with and connected to the pair of first panels such that the pair of first panels alternates with the pair of second panels;
a first handle hole formed in each first panel of the pair of first panels, the first handle hole being disposed a hole height from a bottom edge of each first panel, the hole height being similar to a handle height of the pair of handles of the container;

a tab connected to one end of one of the second panels and configured to be adhered to an opposite end of one of the first panels to form the protective box;
a front flap connected to a top of one of the pair of first panels, the front flap have a pair of corners;
a pair of side flaps, each side flap of the pair of side flaps being connected to a corresponding one of the pair of second panels, each side flap having a slot sized to receive one of the pair of corners; and
a back flap connected to the other of the pair of first panels,
wherein when completed using the blank, the protective box has an open bottom that does not enclose the container.

11. The blank of claim 10, wherein the pair of side flaps, the front flap, and the back flap are configured to interengage to form an upper wall of the protective box.

12. The device of claim 10, wherein each of the side flaps of the pair of side flaps is formed with a slot, sized to receive a corner of the front flap.

13. The device of claim 10, wherein the protective box further comprises a second handle hole formed in each first panel of the pair of first panels and positioned between the first handle hole and a top of each first panel.

14. The device of claim 10, wherein the first width is 8 to 14 inches, the second width is 12 to 20 inches, and the protective box height is 20 to 40 inches.

15. A device for lifting and protecting plants comprising:
a rectangular container operable to receive the plants, the rectangular container having four sides, a bottom, an open top, and a pair of handles disposed on opposite sides of the container at a first height;
a protective box having,
a pair of first panels alternating with a pair of second panels, the pair of first panels and the pair of second panels connected together and arranged to define a rectangular perimeter, the pair of first panels being disposed opposite one another, the rectangular perimeter being sized to receive the rectangular container for transporting the plants with a clearance fit;
a handle hole formed in each first panel of the pair of first panels, the handle hole being collocated with a handle of the container;
a plurality of openings formed in the pair of first panels and the pair of second panels, the openings disposed in predetermined positions to allow airflow through the box; and
an open lower end configured to receive the rectangular container in a clearance fit that does not enclose the bottom of the rectangular container, wherein the protective box is free of any attachment to the rectangular container.

16. The device of claim 15 wherein the protective the further comprises an upper panel comprising:
a front flap connected to an upper edge of one of the pair of first panels;
a back flap connected to the upper edge of the other of the pair of first panels; and
a pair of side flaps connected to the upper edge of the pair of second panels,
the pair of side flaps, the back flap, and the front flap being configured to interengage to form the upper panel.

17. The device of claim 15 wherein the protective box further comprises a second handle hole formed in each first panel of the pair of first panels, the second handle hole being disposed proximate to a top of each first panel and above the handle hole.

18. The device of claim 15, wherein the protective box is formed from a single corrugated cardboard blank, the cardboard blank having a water resistant wax coating and a thickness of 32 edge crush test (ECT).

19. The device of claim 15, wherein the plurality of openings provide airflow between boxes when two or more boxes are stacked together.

20. The device of claim 15, wherein each first panel of the pair of first panels has a width is 8 to 14 inches, wherein each second panel of the pair of second panels has a width of 12 to 20 inches, and wherein the protective box has a height of 20 to 40 inches.

* * * * *